(12) United States Patent
Shinde et al.

(10) Patent No.: US 10,025,659 B2
(45) Date of Patent: Jul. 17, 2018

(54) SYSTEM AND METHOD FOR BATCH MONITORING OF PERFORMANCE DATA

(71) Applicant: AVEKSHAA TECHNOLOGIES PRIVATE LTD, Bangalore (IN)

(72) Inventors: Ashutosh Shashank Shinde, Bangalore (IN); Rajinder Gandotra, Bangalore (IN)

(73) Assignee: AVEKSHAA TECHNOLOGIES PRIVATE LTD, Karnataka (IN)

( * ) Notice: Subject to any disclaimer, the term of this patent is extended or adjusted under 35 U.S.C. 154(b) by 139 days.

(21) Appl. No.: 15/231,565

(22) Filed: Aug. 8, 2016

(65) Prior Publication Data

US 2017/0046217 A1 Feb. 16, 2017

(30) Foreign Application Priority Data

Aug. 12, 2015 (IN) .............................. 685/CHE/2015

(51) Int. Cl.
*G06F 11/34* (2006.01)
*G06F 11/07* (2006.01)
*G06F 11/30* (2006.01)

(52) U.S. Cl.
CPC ........ *G06F 11/0793* (2013.01); *G06F 11/079* (2013.01); *G06F 11/0709* (2013.01); *G06F 11/0715* (2013.01); *G06F 11/3024* (2013.01); *G06F 11/3409* (2013.01); *G06F 11/3495* (2013.01)

(58) Field of Classification Search
CPC ............. G06F 11/3428; G06F 11/0793; G06F 11/3409

USPC .......................................................... 714/37
See application file for complete search history.

(56) References Cited

U.S. PATENT DOCUMENTS

| | | | |
|---|---|---|---|
| 2006/0048155 A1* | 3/2006 | Wu ........................ | G06F 9/4843 718/101 |
| 2010/0017008 A1* | 1/2010 | Yelchuru .......... | G05B 19/41875 700/108 |
| 2010/0063611 A1* | 3/2010 | Patel ..................... | G05B 23/024 700/108 |
| 2013/0247050 A1* | 9/2013 | Watanabe ................. | G06F 9/46 718/101 |
| 2015/0058195 A1* | 2/2015 | Comly .................. | G06Q 40/04 705/37 |

(Continued)

*Primary Examiner* — Chae M Ko
(74) *Attorney, Agent, or Firm* — Barry Choobin; Patent 360 LLC

(57) ABSTRACT

A system and method for batch monitoring of performance of an information technology system are provided. The method includes configuring log collection, email and incidents of a batch job using a configuration manager, capturing a start of a batch job and event log and stream the captured data to an analytical engine, predicting an end time for the batch job and initiate the collection of a plurality of environment data including the CPU and memory data at a pre-determined frequency, increasing the frequency of the data collection, and generating alert to the concerned personnel of the client device and subsequently initiating the troubleshooting procedure when a slowness in the data collection is detected by the analytical engine, completing the troubleshooting procedure by the analytical engine when an auto-correction mechanism is enabled, and generating a report for historical reference and storing the generated report in a database for further references.

19 Claims, 4 Drawing Sheets

(56) References Cited

U.S. PATENT DOCUMENTS

2015/0277976 A1* 10/2015 De .................. G06F 9/4843
718/101

* cited by examiner

SYSTEM AND METHOD FOR BATCH MONITORING OF PERFORMANCE DATA

CROSS REFERENCE TO RELATED APPLICATIONS

Benefit is claimed under 35 U.S.C. 119(a)-(d) to Foreign application Serial No. 685/CHE/2015 filed in India entitled "SYSTEM AND METHOD FOR BUSINESS-IT PREDICTABILITY AND ASSURANCE PLATFORM", on Feb. 12, 2015 and subsequently postdated by 6 months to Aug. 12, 2015, which is herein incorporated in its entirety by reference for all purposes.

BACKGROUND

Technical Field

The embodiments herein are generally related to data monitoring and analysis. The embodiments herein are particularly related to monitoring and analysis of batch process in an information technology (IT) system.

Description of the Related Art

Advances in technology have allowed organizations to expand the business opportunities and open new markets across the globe. With this expansion, the organization creates and processes huge amounts of data in batches. Batch processing refers to computer programs that are executed usually in an offline mode (after working hours) as a sequence of operations with minimal or no human intervention. Further, the organizations use a plurality of methods and systems to monitor performance data related to a batch job for various purposes. The purposes of monitoring and analyzing performance data include but are not limited to anomaly detection, fraud detection, root-cause analysis, analyzing enterprise risk, overall system health monitoring, and the like.

A number of approaches are used for fulfilling the above-mentioned purposes. The examples of the approaches include, but are not limited to density based techniques, cluster-based analysis, replication of the neural network, and the like. However, the conventional methods for monitoring performance health of batch jobs faces many problems including but not limited to scalability issues, lack of a consolidated view of performance levels across batch jobs, limited information for detection of performance issues across jobs and the technology stack, lack of co-relation between batch performance and infrastructure utilization, and the like.

Hence, there is a need for a system and method for efficient and effective monitoring of batch job performance to get a consolidated picture across health of multiple batch jobs. Further, there is a need for a system and method for monitoring performance of batch job for quickly identifying the batch jobs that have degraded performance levels for immediate remediation. Still further, there is a need for a system and method for monitoring performance of batch jobs at various levels to understand the root-cause of the problem, either in the sub-batches or the infrastructure components used by the batch jobs.

The above-mentioned shortcomings, disadvantages, and problems are addressed herein and which will be understood by reading and studying the following specification.

OBJECTS OF THE EMBODIMENTS HEREIN

The primary object of the embodiments herein is to provide a system and method for monitoring performance data related to a batch job.

Another object of the embodiment herein is to provide a system and method to analyze and predict the behavior of information technology system when running a batch process.

Yet another object of the embodiments herein is to provide a system and method to detect anomaly at various levels of a plurality of batch jobs.

Yet another object of the embodiments herein is to provide a scalable and efficient batch monitoring system.

Yet another object of the embodiments herein is to enable prediction of performance and stability issues in information technology systems (IT) handing batches before the issues affect the functioning of business.

Yet another object of the embodiments herein is to provide a system and method to enable continuous monitoring, modeling, analysis and fixing of performance, availability, scalability and security issues in the IT system handling performance data related to a batch job.

Yet another object of the embodiments herein is to provide a system and method for efficient and effective monitoring of batch job performance to get a consolidated picture across health of multiple batch jobs.

Yet another object of the embodiments herein is to provide a system and method for monitoring performance of batch job for quickly identifying the batch jobs that have degraded performance levels for immediate remediation.

Yet another object of the embodiments herein is to provide a system and method for monitoring performance of batch jobs at various levels to understand the root-cause of the problem, either in the sub-batches or the infrastructure components used by the batch jobs.

Yet another object of the embodiments herein is to create a new API based on user requirements for a plurality of other batch monitoring systems.

These and other objects and advantages of the embodiments herein will become readily apparent from the following detailed description taken in conjunction with the accompanying drawings.

SUMMARY

The embodiments herein provide a system and method for batch monitoring of performance data related to a batch job. The batch monitoring methods and system use fundamental mathematical models and deep knowledge to monitor the performance data in batches. Monitoring these batch processes is essential to ensure the fail-safe operation and to ensure that they produce consistent performance.

The various embodiments herein provide a system for batch monitoring of transaction data in batches. The system includes a user interface, a log, a configuration manager, a log parser, an analytical engine, and a database.

The user interface configured to display monitored performance levels of a plurality of batches, wherein the user interface is accessed on a client device. Further, the user interface is used for monitoring and analyzing the transaction data in batches. The examples of the batch data include, but are not limited to financial data, retail data, and enterprise resource planning (ERP) data, network data, geographical data, spatial data, financial market data, stock-market data, insurance data, mobile application data, and the like.

The log is configured for storing a plurality of log files of the batch data and is further configured to store the plurality of performance data collected in a plurality of batches.

The configuration manager configures the batch data monitoring system. The configuration manager stores a plurality of information based on which the performance of the batches is monitored. According to an embodiment herein, the configuration manager is communicably coupled with the log.

The log parser is configured for automating a plurality of tests for the log, and the log parser works as a data processing pipeline by taking a query expression in any of the query formats using a query language for outputting the lines containing matches for the query expression. According to an embodiment herein, the log parser is communicably coupled with the log.

The database configured to store a plurality of the performance data related to batch jobs including a historical data, and the database is communicably coupled with the analytical engine.

The analytical engine configured to analyze the performance of the batch data and also the system log data. Further, the analytical engine retrieves the data from the database. The analytical engine applies a plurality of pre-defined models in batches, and the analytical engine further predicts the end time for a batch job and starts a collection of data from a plurality of sources. Further, the analytical engine continuously collects the data at a pre-defined frequency and further selectively increases the frequency of data collection when a slowness of data collection is detected and generate alert to the concerned personnel of the client device. According to an embodiment herein, the analytical engine further initiates a troubleshooting process and complete the corrective action when auto-correction is enabled.

According to an embodiment herein, the batch monitoring system is implemented in three layers namely a client layer, a web layer, and a database layer. The client layer includes the user interface, the web layer includes the analytical engine, the log parser, the log and the configuration manager, and the database layer includes the database.

According to an embodiment herein, the user interface is a graphical user interface (GUI), and the user interface allows sharing of the monitored and analyzed performance data in batch process with a plurality of authorized client devices.

According to an embodiment herein, the plurality of information stored in the configuration manager includes a plurality of log files, a plurality of batch related information, a plurality of log harvesting patterns, a database configuration default configuration settings, nature of monitoring and constraints for configuring the application data monitoring system.

According to an embodiment herein, the predetermined frequency for collecting the data is set by an administrator of the client device and the batch monitoring system.

According to an embodiment herein, the analytical engine generates a corrective action report for historical reference.

According to an embodiment herein, the analytical engine detects a plurality of anomalies in the performance of the batch process by comparing the monitored data with the stored historical data.

According to an embodiment herein, the analytical engines incorporates machine learning and artificial intelligence for detecting the anomalies in the performance of the batch process.

The embodiments herein provide a method for batch monitoring of information technology systems. The steps include configuring log collection, email and incidents of a batch job using a configuration manager, capturing a start of a batch job and event log and stream the captured data to an analytical engine, predicting an end time for the batch job and initiate the collection of a plurality of environment data including the CPU and memory data at a pre-determined frequency, increasing the frequency of the data collection, and generating alert to the concerned personnel of the client device and subsequently initiating the troubleshooting procedure when a slowness in the data collection is detected by the analytical engine, completing the troubleshooting procedure by the analytical engine when an auto-correction mechanism is enabled, and generating a report for historical reference and storing the generated report in a database for further references.

According to an embodiment herein, the batch job is configured based on a plurality of constraints of a client device and the batch monitoring system.

According to an embodiment herein, the duration of the batch job is set by the administrator of the client device.

According to an embodiment herein, the duration of the batch job depends on the amount of data and the speed at which the data is processed.

According to an embodiment herein, the troubleshooting is completed by identifying the anomaly in the performance of the batch process.

According to an embodiment herein, the concerned personnel is alerted using one of visual warning on the client device, an audio wanting on the client device, a text, and a phone ring.

According to an embodiment herein, the prediction of the end time of the batch job is based on a plurality of parameters. The collection of the plurality of the environment data is checked by the analytical engine periodically, and wherein the period is set by one of the concerned personnel of the client device and the batch monitoring system.

According to an embodiment herein, the concerned personnel of the client device manually checks each step in the batch monitoring system to determine a root cause for the slowness of the frequency in the data collection.

According to an embodiment herein, the batch monitoring system includes one or more modules that are configured to create new application program interface (APIs) based on user requirements to allow other systems to use the same batch monitoring modules. This enables the batch monitoring systems to monitor performance of one or more batches without needing additional infrastructure. In addition, providing APIs to other batch monitoring systems also allows the existing batch monitoring system to track the data and metadata and improve the process based on the analysis and feedback.

For new batches under development, Batch Monitoring API's/SDK's will be provided for different commonly used languages like Java, C#, C++ etc. The system for monitoring performance data includes an application program interface (API) module. The API module provides APIs for the new batches under development. The APIs provide finer details about the batch execution compared to harvesting data from the logs based on logging patterns.

According to an embodiment herein, the APIs provide a standard logging semantics and meta-data which are easily analyzed by a batch monitoring engine. The APIs decorate the logs with a plurality of pre-defined keywords and annotations, and improve the parsing and analysis process. According to an embodiment herein, this method enables creation of a call graph across batches, sub-batches, and a plurality of other dependent systems. The call graphs are used to determine a plurality of degraded batches or sub-batches or dependent systems to initiate a remediation specifically for identified bottlenecks. Further, the APIs provided is extended to existing batches, after modifying the source code of the batches.

According to an embodiment herein, for existing batches that are developed in the languages like Java and C# which provide an annotation engine, the APIs provide a custom annotation classes for standard logging semantics and metadata. The information logged through the custom annotations are used for creating the batch execution call graph. The information used for the creation of batch execution call graph is used by the analysis engine to identify performance issues in the batches, sub-batches or dependent systems, and initiate remediation.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
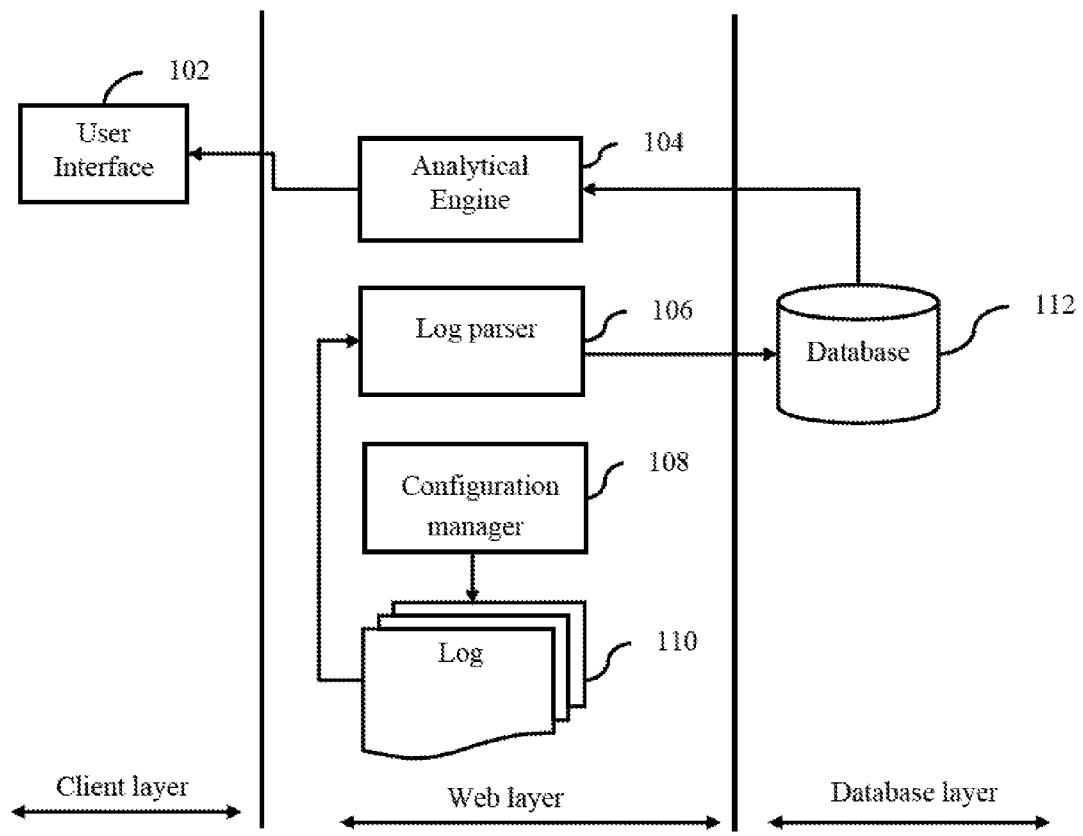
FIG. 1 illustrates a block diagram illustrating the monitoring the batch data such as transaction data in batches, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, reference is made to the accompanying drawings that form a part hereof; and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system and method for batch monitoring of performance of the batch process. The batch monitoring methods and system use fundamental mathematical models and deep knowledge to monitor the performance of the batch process. Monitoring these batch processes is essential to ensure the failure-safe operation and to ensure that they produce consistent performance.

The embodiments herein provide a system and method for batch monitoring of performance data related to a batch job. The batch monitoring methods and system use fundamental mathematical models and deep knowledge to monitor the performance data in batches. Monitoring these batch processes is essential to ensure the fail-safe operation and to ensure that they produce consistent performance.

The various embodiments herein provide a system for batch monitoring of transaction data in batches. The system includes a user interface, a log, a configuration manager, a log parser, an analytical engine, and a database.

The user interface configured to display monitored performance levels of a plurality of batches, wherein the user interface is accessed on a client device. Further, the user interface is used for monitoring and analyzing the transaction data in batches. The examples of the batch data include, but are not limited to financial data, retail data, and enterprise resource planning (ERP) data, network data, geographical data, spatial data, financial market data, stock-market data, insurance data, mobile application data, and the like.

The log is configured for storing a plurality of log files of the batch data and is further configured to store the plurality of performance data collected in a plurality of batches.

The configuration manager configures the batch data monitoring system. The configuration manager stores a plurality of information based on which the performance of the batches is monitored. According to an embodiment herein, the configuration manager is communicably coupled with the log.

The log parser is configured for automating a plurality of tests for the log, and the log parser works as a data processing pipeline by taking a query expression in any of the query formats using a query language for outputting the lines containing matches for the query expression. According to an embodiment herein, the log parser is communicably coupled with the log.

The database configured to store a plurality of the performance data related to batch jobs including a historical data, and the database is communicably coupled with the analytical engine.

The analytical engine configured to analyze the performance of the batch data and also the system log data. Further, the analytical engine retrieves the data from the database. The analytical engine applies a plurality of pre-defined models in batches, and the analytical engine further predicts the end time for a batch job and starts a collection of data from a plurality of sources. Further, the analytical engine continuously collects the data at a pre-defined frequency and further selectively increases the frequency of data collection when a slowness of data collection is detected and generate alert to the concerned personnel of the client device. According to an embodiment herein, the analytical engine further initiates a troubleshooting process and complete the corrective action when auto-correction is enabled.

According to an embodiment herein, the batch monitoring system is implemented in three layers namely a client layer, a web layer, and a database layer. The client layer includes the user interface, the web layer includes the analytical engine, the log parser, the log and the configuration manager, and the database layer includes the database.

According to an embodiment herein, the user interface is a graphical user interface (GUI), and the user interface allows sharing of the monitored and analyzed performance data in batch process with a plurality of authorized client devices.

According to an embodiment herein, the plurality of information stored in the configuration manager includes a plurality of log files, a plurality of batch related information, a plurality of log harvesting patterns, a database configuration default configuration settings, nature of monitoring and constraints for configuring the application data monitoring system.

According to an embodiment herein, the predetermined frequency for collecting the data is set by an administrator of the client device and the batch monitoring system.

According to an embodiment herein, the analytical engine generates a corrective action report for historical reference.

According to an embodiment herein, the analytical engine detects a plurality of anomalies in the performance of the batch process by comparing the monitored data with the stored historical data.

According to an embodiment herein, the analytical engines incorporates machine learning and artificial intelligence for detecting the anomalies in the performance of the batch process.

The embodiments herein provide a method for batch monitoring of information technology systems. The steps include configuring log collection, email and incidents of a batch job using a configuration manager, capturing a start of a batch job and event log and stream the captured data to an analytical engine, predicting an end time for the batch job and initiate the collection of a plurality of environment data including the CPU and memory data at a pre-determined frequency, increasing the frequency of the data collection, and generating alert to the concerned personnel of the client device and subsequently initiating the troubleshooting procedure when a slowness in the data collection is detected by the analytical engine, completing the troubleshooting procedure by the analytical engine when an auto-correction mechanism is enabled, and generating a report for historical reference and storing the generated report in a database for further references.

According to an embodiment herein, the batch job is configured based on a plurality of constraints of a client device and the batch monitoring system.

According to an embodiment herein, the duration of the batch job is set by the administrator of the client device.

According to an embodiment herein, the duration of the batch job depends on the amount of data and the speed at which the data is processed.

According to an embodiment herein, the troubleshooting is completed by identifying the anomaly in the performance of the batch process.

According to an embodiment herein, the concerned personnel is alerted using one of visual warning on the client device, an audio warning on the client device, a text, and a phone ring.

According to an embodiment herein, the prediction of the end time of the batch job is based on a plurality of parameters. The collection of the plurality of the environment data is checked by the analytical engine periodically, and wherein the period is set by one of the concerned personnel of the client device and the batch monitoring system.

According to an embodiment herein, the concerned personnel of the client device manually checks each step in the batch monitoring system to determine a root cause for the slowness of the frequency in the data collection.

For new batches under development, Batch Monitoring API's/SDK's will be provided for different commonly used languages like Java, C#, C++ etc. The system for monitoring performance data includes an application program interface (API) module. The API module provides APIs for the new batches under development. The APIs provide finer details about the batch execution compared to harvesting data from the logs based on logging patterns.

According to an embodiment herein, the APIs provide a standard logging semantics and meta-data which are easily analyzed by a batch monitoring engine. The APIs decorate the logs with a plurality of pre-defined keywords and annotations, and improve the parsing and analysis process. According to an embodiment herein, this method enables creation of a call graph across batches, sub-batches, and a plurality of other dependent systems. The call graphs are used to determine a plurality of degraded batches or sub-batches or dependent systems to initiate a remediation specifically for identified bottlenecks. Further, the APIs provided is extended to existing batches, after modifying the source code of the batches.

According to an embodiment herein, for existing batches that are developed in the languages like Java and C# which provide an annotation engine, the APIs provide a custom annotation classes for standard logging semantics and meta-data. The information logged through the custom annotations are used for creating the batch execution call graph. The information used for the creation of batch execution call graph is used by the analysis engine to identify performance issues in the batches, sub-batches or dependent systems, and initiate remediation.

FIG. 1 illustrates a block diagram illustrating the monitoring of the performance of the batch process, according to an embodiment herein. The performance of the batch process is monitored by a plurality of concerned personnel at various levels namely a client layer, a web layer, and a database layer. The monitoring of the performance of the batch process is at various levels is essential for detecting anomalies at each level and fix the errors accordingly. Further, monitoring the performance of the batch process at various levels allows the concerned personnel to analyze the root cause of the problem. The problems that are monitored in the performance of the batch data include, but are not limited to anomaly detection, root-cause analysis, and the like. The applications of the monitoring of the performance of the batch data is applicable in a plurality of fields including but not limited to automated teller machines (ATM) monitoring, fraud detection, stock market monitoring, individual credit card, debit card monitoring, retail, enterprise resource planning, monitoring the financial details of an institution and the like.

The block diagram includes a user interface 102 at the client layer, an analytical engine 104, a log parser 106, a configuration manager 108, and a log 110 in the web layer, and a database 112 in the database layer. According to an embodiment herein, the batch monitoring system is implemented as a backend processing coupled with a front-end system to display the results. The front-end system is a client device on which the monitored performance data of the batch job is displayed. The examples of the client device include, but are not limited to a laptop, a computer, a smart television, a tablet computer, a smartphone and the like. The batch monitoring system for monitoring performance of the batch process is supported as a dedicated software system, a browser-enabled system or a mobile application.

The client layer having the user interface 102 is primarily used on the client device to display the monitoring of the performance of the batch job in an information technology system. The user interface 102 is accessed through a client device. According to an embodiment herein, the user interface 102 is displayed as a graphical user interface (GUI) for monitoring and analyzing the predictions of the performance of the batch job. The client layer 102 has the capability to share and analyze the monitored data without disturbing the backend processing of the system. According to an embodiment herein, the user interface 102 allows the concerned personnel to share the monitored data with other concerned personnel.

The client layer 102 is communicably coupled with the web layer where the analysis of the performance level of the batch job is processed. According to an embodiment herein, the web layer processes the application data in near real-time to monitor and analyze the anomalies. The system includes logs 110 which includes the network log files of the batch job.

The log 110 is managed and controlled by the configuration manager 108. The configuration manager 108 has information about a plurality of log files, a plurality of batches, a log harvesting pattern, and a database configuration that are required to configure the log 110 and the database 112. According to an embodiment herein, the configuration for each of the batch monitoring system varies according to the requirements of the client, the nature of the monitoring, amount of application data to be monitored and the like.

Further, the system includes the log parser 106 configured for automating a plurality of tests for the log. The log parser works as a data processing pipeline by taking a query expression in a query language such as a structured query language (SQL) outputting the lines containing matches for the query expression. According to an embodiment herein, the log parser 106 inputs the query expression using a command line interface. According to an embodiment herein, the log parser 106 inputs the query expression using a GUI.

The web layer further includes the analytical engine 104 configured for analyzing the performance of the batch job. The analytical engine 104 retrieves the data from the database 112 for analyzing the performance data. The analytical engine applies a plurality of models required for monitoring the performance of the batch job in near real-time. According to an embodiment herein, the analytical engine 104 is located on a cloud server. The analytical engine 104 captures the data from the database and streams on the cloud for enabling the monitoring and analyzing. Further, the analytical engine 104 predicts the end time for the batch job and starts a collection of the data of the central processing unit (CPU), memory, and other environmental data at low frequency. The analytical engine 104 continuously collects the data at a pre-determined frequency. The pre-determined frequency is preferably set by the administrator of the batch monitoring system. According to an embodiment herein, the predetermined frequency is set by the administrator of the client device.

According to an embodiment herein, when multiple incidents or slowness detected in the data collection procedure, the analytics engine 104 increases the frequency of the data collection and a concerned personnel is alerted. According to an embodiment herein, the frequency of the data collection to be labeled as slow is defined by the administrator of the client device. The examples of the alarm used for alerting the concerned personnel include, but are not limited to a visual warning, an audio warning, a text, a phone ring, and the like. Further, the analytical engine 104 initiates the troubleshooting mechanism. The troubleshooting mechanism is initiated only after the slowness in the frequency is detected. The troubleshooting is based on the history of the application data and the anomalies detected in the data.

According to an embodiment herein, the anomalies are detected based on the techniques such as machine learning and artificial intelligence.

The administrator of the client device has the ability to enable the auto-correction in the analytical engine 104 to initiate the troubleshooting mechanism or to manually solve the issue. According to an embodiment herein, when the auto-correction of the troubleshooting is enabled, the analytical engine 104 completes the corrective action and generate a report to store data for further historical reference.

The auto-corrective action is defined by the batch monitoring system in conjunction with the client system. According to an embodiment herein, the analytical engine 104 has the capability to troubleshoot multiple slow instances and anomalies at a time. The analytical engine 104 is a powerful processor placed in the cloud.

Further, the batch monitoring system includes the database 112 configured to store a plurality of data related to the batch monitoring system. The data stored in the database 112 include a historical data, a default configuration setting of the application data monitoring system, possible data modeling and analysis models, mathematical models, and the like. The database 112 is communicably coupled with an analytical engine.

For new batches under development, Batch Monitoring API's/SDK's will be provided for different commonly used languages like Java, C#, C++ etc. The system for monitoring performance data includes an application program interface (API) module. The API module provides APIs for the new batches under development. The APIs provide finer details about the batch execution compared to harvesting data from the logs 110 based on logging patterns.

According to an embodiment herein, the APIs provide a standard logging semantics and meta-data which are easily analyzed by a batch monitoring engine. The APIs decorate the logs with a plurality of pre-defined keywords and annotations, and improve the parsing and analysis process. According to an embodiment herein, this method enables creation of a call graph across batches, sub-batches, and a plurality of other dependent systems. The call graphs are used to determine a plurality of degraded batches or sub-batches or dependent systems to initiate a remediation specifically for identified bottlenecks. Further, the APIs provided is extended to existing batches, after modifying the source code of the batches.

According to an embodiment herein, for existing batches that are developed in the languages like Java and C# which provide an annotation engine, the APIs provide a custom annotation classes for standard logging semantics and meta-data. The information logged through the custom annotations are used for creating the batch execution call graph. The information used for the creation of batch execution call graph is used by the analysis engine to identify performance issues in the batches, sub-batches or dependent systems, and initiate remediation.

Figure 2A:
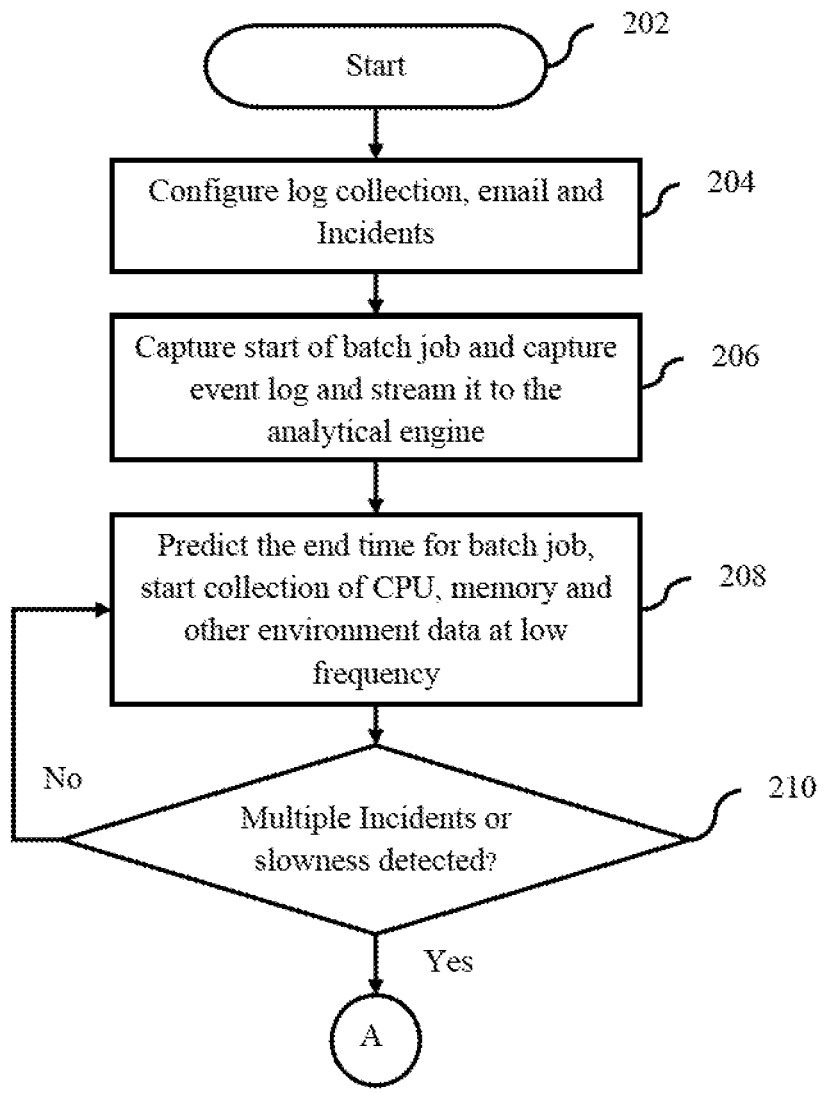
FIG. 2A and FIG. 2B jointly illustrate a flowchart explaining the process of monitoring the transaction data in batches, according to an embodiment herein.
Figure 2B:
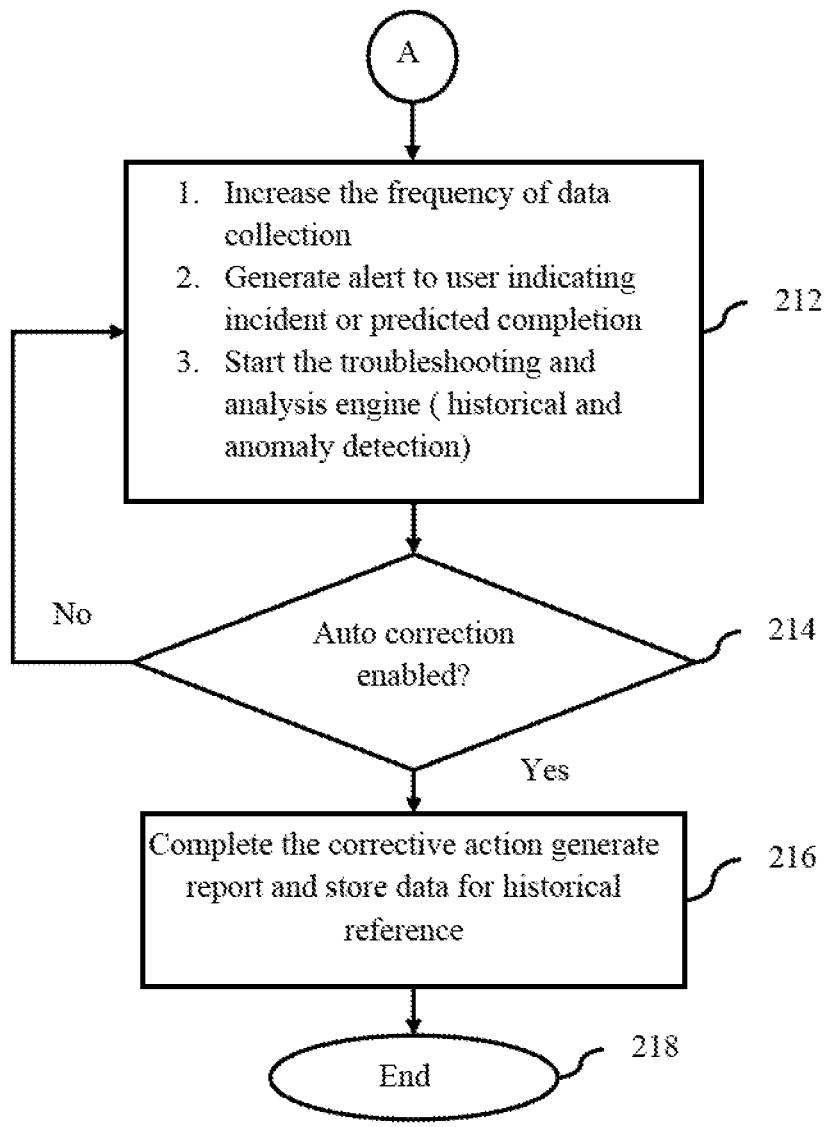

FIG. 2 illustrates a flowchart explaining the process of monitoring the performance of the batch job, according to an embodiment herein. At first, the process of monitoring the performance of the batch job is initiated on the client device (Step 202). Further, the log collection, email, and incidents are configured from the log of the application monitoring system (Step 204). The configuration of the batch monitoring system is based on the requirements of the client and the constraints of the batch monitoring system.

Once the system is configured, the batch job is initiated and the event logs are captured and is streamed to the analytical engine hosted on the cloud server (Step 206).

According to an embodiment herein, the start of the batch job is defined by the concerned personnel of the client device.

Once the batch job is initiated, the batch monitoring system predicts the end time for the batch job and starts a collection of CPU memory and other environmental details of the system at a low frequency (Step 208). According to an embodiment herein, the prediction of the end time of the batch job is based on a plurality of parameters, including but not limited to the type of batch data, constraints of the client system, constraints of the batch monitoring system and the like.

Further, during the data collection the frequency for data collection is constantly checked (Step 210). The collection frequency is checked periodically. According to an embodiment herein, the period is set by the concerned personnel of the client device. According to an embodiment herein, the period for checking the performance of the batch job is set by the concerned personnel. The examples of the period include, but are not limited to five minutes, ten minutes, once in an hour, and the like. According to an embodiment herein, the period is varied based on the amount of data, timings, demography, and the like. According to an embodiment herein, when the frequency of the data collection is as expected, the process of data collection is continued until the end of the batch job.

According to an embodiment herein, when the slowness in the data collection is detected, the batch monitoring system takes a plurality of steps to troubleshoot the problem (Step 212). At first, the rate at which the data is collected is increased, and then an alert is generated indicating the incident or the predicted completion. Further, the analytical engine hosted on the cloud starts the troubleshooting based on the historical data for detecting the anomaly in the monitored batch data.

Further, process checks for the auto-correction enablement for automatically troubleshooting the anomaly (Step 214). Step 212 is repeated and the concerned personnel is alerted for troubleshooting the detected slowness. According to an embodiment herein, when the auto-correction is enabled, the batch monitoring system completes the corrective action automatically and completes the corrective action (Step 216). According to an embodiment herein, when the auto-correct option is not enabled, the concerned personnel manually checks each step in which the slow instance is detected and troubleshoot the issue.

Further, a report is generated on the corrective measures taken and is stored in a database further references.

The process of detecting anomalies and troubleshooting is continued until the end of the batch job and the process is temporarily terminated when the batch job ends (Step 218).

Figure 3:
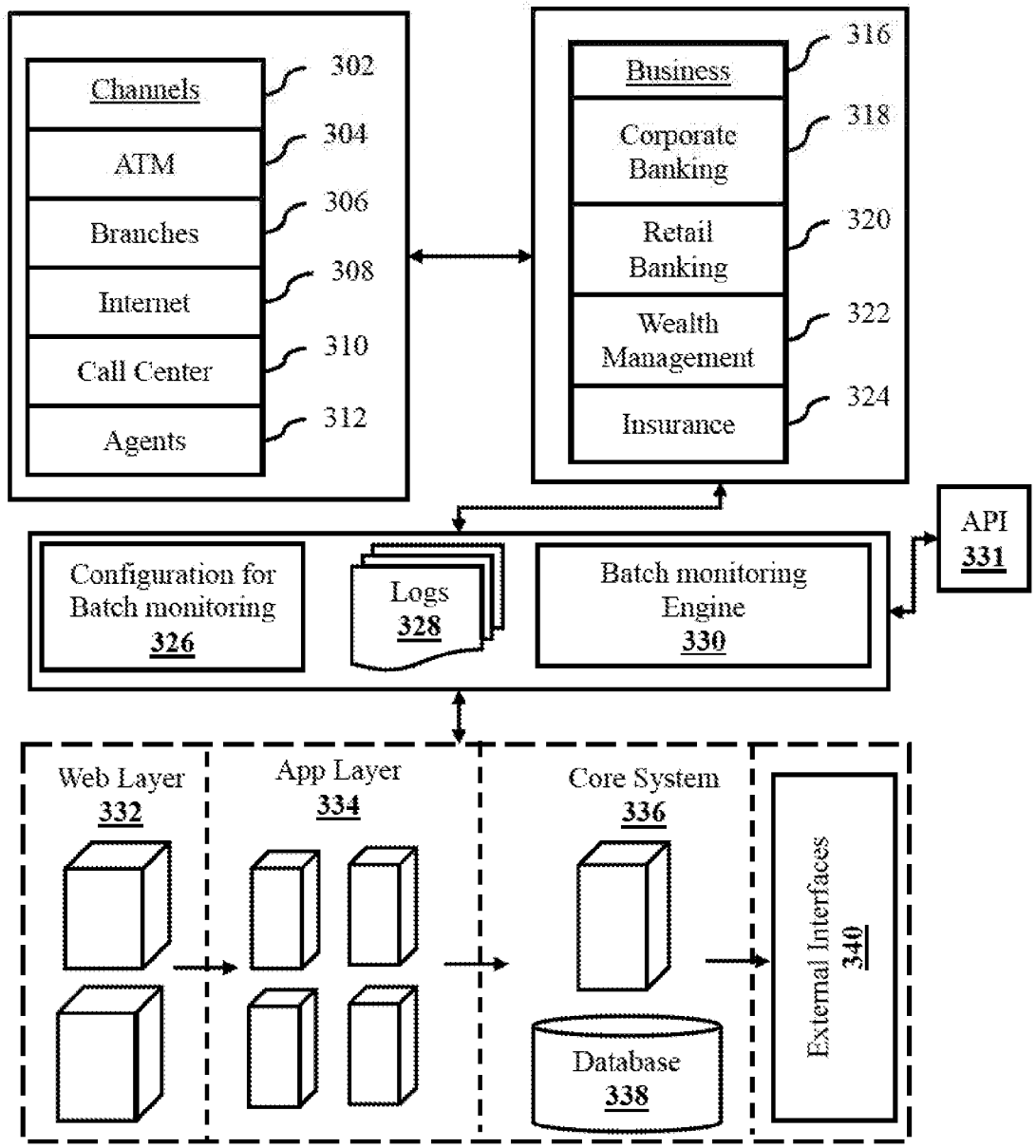
FIG. 3 illustrates a use case diagram illustrating the monitoring and analyzing the transaction data in batches, according to an embodiment herein.

FIG. 3 illustrates a use case diagram illustrating the monitoring and analyzing the performance data, according to an embodiment herein. According to an embodiment herein, a plurality of businesses 316 such as a financial institution uses the batch monitoring process at various levels for detecting and analyzing anomaly detection. The examples of the business 316 include, but are not limited to corporate banking 318, retail banking 320, wealth management 322, insurance 324, and the like. The businesses 316 uses a plurality of channels 302 for deploying the services where the anomalies are present. The examples of the plurality of channels 302 include, but are not limited to automated teller machines (ATM) 302, a plurality of branches of organizations where the transactions take place 304, an internet service 308, a call center 310, and a plurality of agents 312.

The communication between the business 316 and the channel 302 is analyzed for detecting anomalies. Typically the system is configured for batch monitoring 326, and the logs 328 are analyzes. Further, a batch monitoring engine 330 analyses the data in batches across a web layer 332, an application layer 334, and a core system 336. Each of the layers includes a plurality of servers and the core system 336 includes a database 338 for storing the analyzed data. Further, the output of the batch monitored data is transmitted to external interfaces 340 for further processing.

The embodiments herein provide a system and method for batch monitoring at various levels. Further, the embodiments herein are to provide a scalable and efficient batch monitoring system.

The embodiments herein enable prediction of performance and stability issues in information technology systems (IT) handing data before the issues affect the functioning of business. The embodiments herein enable continuous monitoring, modeling, analysis and fixing of performance, availability, scalability and security issues in the IT system handling application data.

The embodiments herein provide a pre-configured setup for monitoring batch jobs and are easily configurable. Further, the embodiments herein provide a single graphical interface to monitor performance levels of various batches in the enterprise. Furthermore, the embodiments herein provide a real time analysis capabilities and trend analysis capabilities to identify batch operations that are degrading over a period of time.

The system for monitoring performance data includes an application program interface (API) module 331. The API module 331 provided APIs for the new batches under development. The APIs provide finer details about the batch execution compared to harvesting data from the logs 328 based on logging patterns. According to an embodiment herein, the APIs provide a standard logging semantics and meta-data which are easily analyzed by the batch monitoring engine 330. The APIs decorate the logs with a plurality of pre-defined keywords and annotations, and improve the parsing and analysis process. According to an embodiment herein, this method enables creation of a call graph across batches, sub-batches, and a plurality of other dependent systems. The call graphs are used to determine a plurality of degraded batches or sub-batches or dependent systems to initiate a remediation specifically for identified bottlenecks.

Further, the APIs provided by the API module 331 also has the ability to be extended to existing batches, which may require certain level of modification in the source code of the batches. According to an embodiment herein, for existing batches developed in the language that provide an annotation engine, the APIs provide a custom annotation classes for standard logging semantics and meta-data. The information logged through the custom annotations are used for creating the batch execution call graph. The information provided by the call graph is used by the analysis engine to identify performance issues in the batches, sub-batches or dependent systems, and initiate remediation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A system for batch monitoring of a performance levels of a batch job, the system comprises:
   a user interface configured to display monitored performance data related to the batch job, wherein the user interface is accessed on a client device, and wherein the user interface is used for monitoring and analyzing the performance of the batch job;
   a log configured for storing a plurality of network log files of the performance, wherein the log is further configured to store the plurality of performance related data collected in a plurality of batches;
   a configuration manager configured to configure the batch monitoring system, wherein the configuration manager stores a plurality of information based on which the batch monitoring system is monitored, wherein the configuration manager is communicably coupled with the log;
   a log parser configured for automating a plurality of tests for the log, wherein the log parser works as a data processing pipeline by taking an expression from an expression matching engine, wherein the expression matching engine outputs the lines containing matches for the inputted expression, wherein the log parser is communicably coupled with the log;
   a database configured to store a plurality of data related to the performance of the batch job including a historical data, wherein the database is communicably coupled with an analytical engine; and
   an analytical engine configured to analyze the performance of the batch job, wherein the analytical engine retrieves the data from the database, and wherein the analytical engine applies a plurality of pre-defined proprietary models in batches, wherein the analytical engine further predicts the end time for a batch job and starts collection of data from a plurality of sources, and wherein the analytical engine continuously collects the data at a pre-determined frequency and further selectively increases the frequency of data collection when a slowness of data collection is detected and generate alert to the concerned personnel of the client device and further initiate a troubleshooting process and complete the corrective action when auto-correction is enabled.

2. The system according to claim 1, wherein the batch monitoring system is implemented in three layers namely a client layer, a web layer, and a database layer, and wherein the client layer includes the user interface, the web layer includes the analytical engine, the log parser, the log and the configuration manager, and the database layer includes the database.

3. The system according to claim 1, wherein the user interface is a graphical user interface (GUI), and wherein the user interface allows sharing of the monitored and analyzed performance data with a plurality of authorized client devices.

4. The system according to claim 1, wherein the plurality of information stored in the configuration manager includes a plurality of log files, a plurality of batch related information, a plurality of log harvesting patterns, a database configuration default configuration settings, nature of monitoring and constraints for configuring the application data monitoring system.

5. The system according to claim 1, wherein the predetermined frequency for collecting the data is set by an administrator of the client device and the batch monitoring system.

6. The system according to claim 1, wherein the analytical engine generates a corrective action report for historical reference.

7. The system according to claim 1, wherein the analytical engine detects a plurality of anomalies in the performance of the batch job by comparing the monitored data with the stored historical data.

8. The system according to claim 1, wherein the analytical engines incorporates machine learning and artificial intelligence for detecting the anomalies in the performance of the batch job.

9. The system according to claim 1 further comprises an application program interface (API) module configured to provide APIs for a plurality of new batches under development, and wherein the APIs are configured to provide details regarding the batch execution compared to harvesting data from the logs based on logging patterns.

10. The system according to claim 9, wherein the APIs are configured to provide a standard logging semantics and meta-data which are easily analyzed by a batch monitoring engine, and wherein the APIs are configured to equip the logs with a plurality of pre-defined keywords and annotations to increase an efficiency of the parsing and analysis process to create a call graph across batches, sub-batches, and a plurality of other dependent systems, and wherein the call graphs are used to determine or identify a plurality of degraded batches or sub-batches or dependent systems to initiate a remediation for identified problems.

11. The system according to claim 9, wherein the APIs are extended to existing batches, after modifying the source code of the batches, and wherein the APIs are configured to provide a custom annotation classes for standard logging semantics and meta-data for the existing batches that are developed in the languages which provide an annotation engine, and wherein the information logged through the custom annotations are used for creating the batch execution call graph, and wherein the logged information used for the creation of batch execution call graph is used by the analysis engine to identify performance issues in the batches, sub-batches or dependent systems, and initiate remediation.

12. A method for monitoring of performance of a batch job, the method comprising the steps of:
   configuring a log collection, email and incidents of a batch job using a configuration manager, wherein the batch job is configured based on a plurality of constraints of a client device and the monitoring system;
   capturing a start of a batch job and event log and stream the captured data to an analytical engine, wherein the duration of the batch job is set by the administrator of the client device;
   predicting an end time for the batch job and initiate the collection of a plurality of environment data including the CPU and memory data at a pre-determined frequency;
   increasing the frequency of the data collection, and generating alert to the concerned personnel of the client device and subsequently initiating the troubleshooting procedure when a slowness in the data collection is detected by the analytical engine;

completing the troubleshooting procedure by the analytical engine when an auto-correction mechanism is enabled, wherein the troubleshooting is completed by identifying the anomaly in the application data; and generating a report for historical reference and storing the generated report in a database for further references.

13. The method according to claim 12, wherein the concerned personnel is alerted using one of visual warning on the client device, an audio warning on the client device, a text, and a phone ring.

14. The method according to claim 12, wherein the prediction of the end time of the batch job is based on a plurality of parameters, and wherein the plurality of parameters is selected from a group consisting of the transaction data, batch data, a plurality of constraints of the client system, and a plurality of constraints on the batch monitoring system.

15. The method according to claim 12, wherein the collection of the plurality of the environment data is checked by the analytical engine periodically, and wherein the period is set by one of the concerned personnel of the client device and the batch monitoring system.

16. The method according to claim 12, wherein the concerned personnel of the client device manually checks each step in the batch monitoring system to determine a root cause for the slowness of the frequency in the data collection.

17. The method according to claim 12 further comprises providing APIs for a plurality of new batches under development with an application program interface (API) module, and wherein the APIs are configured to provide details regarding the batch execution compared to harvesting data from the logs based on logging patterns.

18. The method according to claim 17, wherein the APIs are configured to provide a standard logging semantics and meta-data which are easily analyzed by a batch monitoring engine, and wherein the APIs are configured to equip the logs with a plurality of pre-defined keywords and annotations to increase an efficiency of the parsing and analysis process to create a call graph across batches, sub-batches, and a plurality of other dependent systems, and wherein the call graphs are used to determine or identify a plurality of degraded batches or sub-batches or dependent systems to initiate a remediation for identified problems.

19. The method according to claim 17, wherein the APIs are extended to existing batches, after modifying the source code of the batches, and wherein the APIs are configured to provide a custom annotation classes for standard logging semantics and meta-data for the existing batches that are developed in the languages which provide an annotation engine, and wherein the information logged through the custom annotations are used for creating the batch execution call graph, and wherein the logged information used for the creation of batch execution call graph is used by the analysis engine to identify performance issues in the batches, sub-batches or dependent systems, and initiate remediation.

* * * * *